United States Patent Office 3,159,001
Patented Dec. 1, 1964

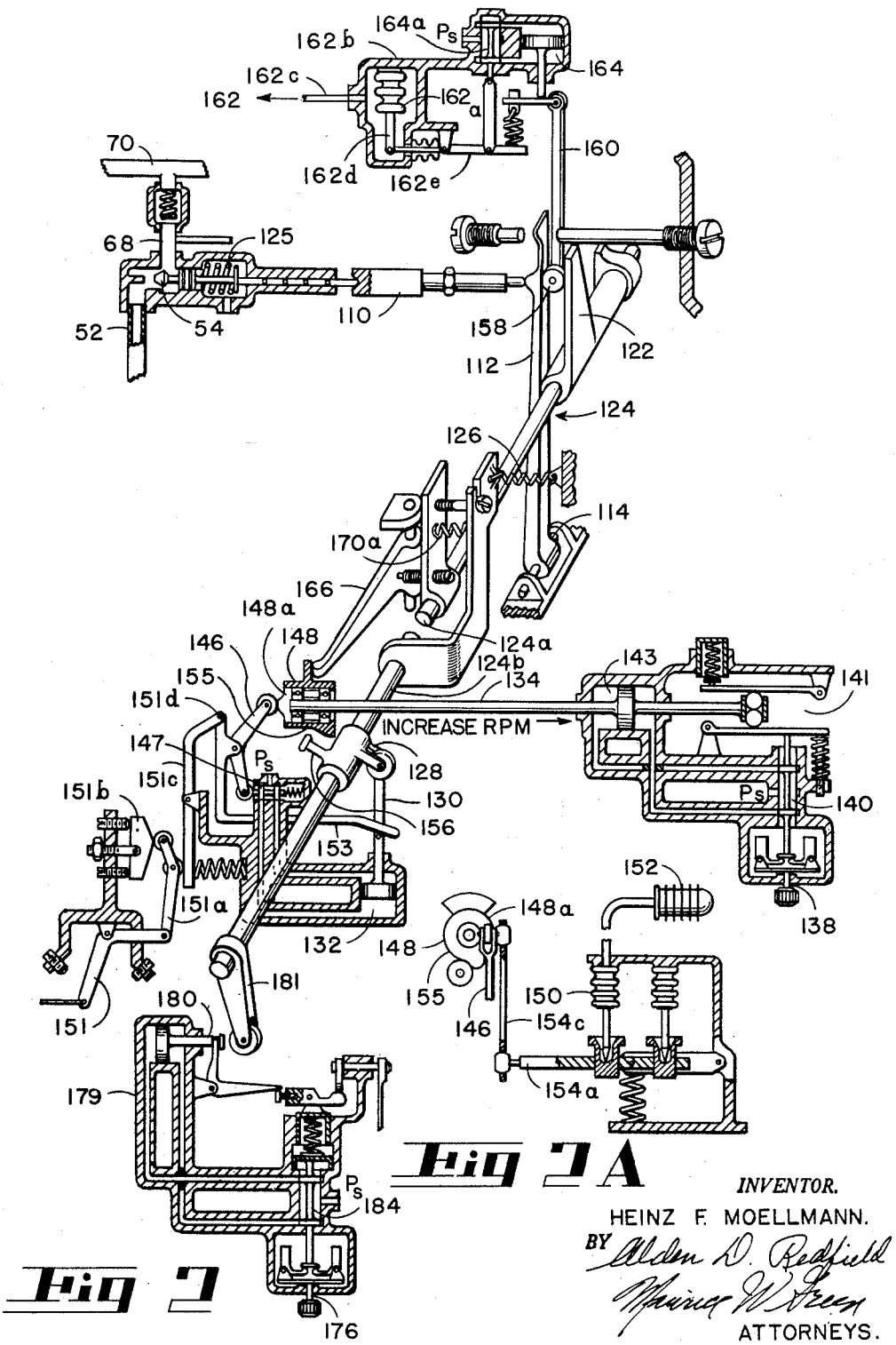

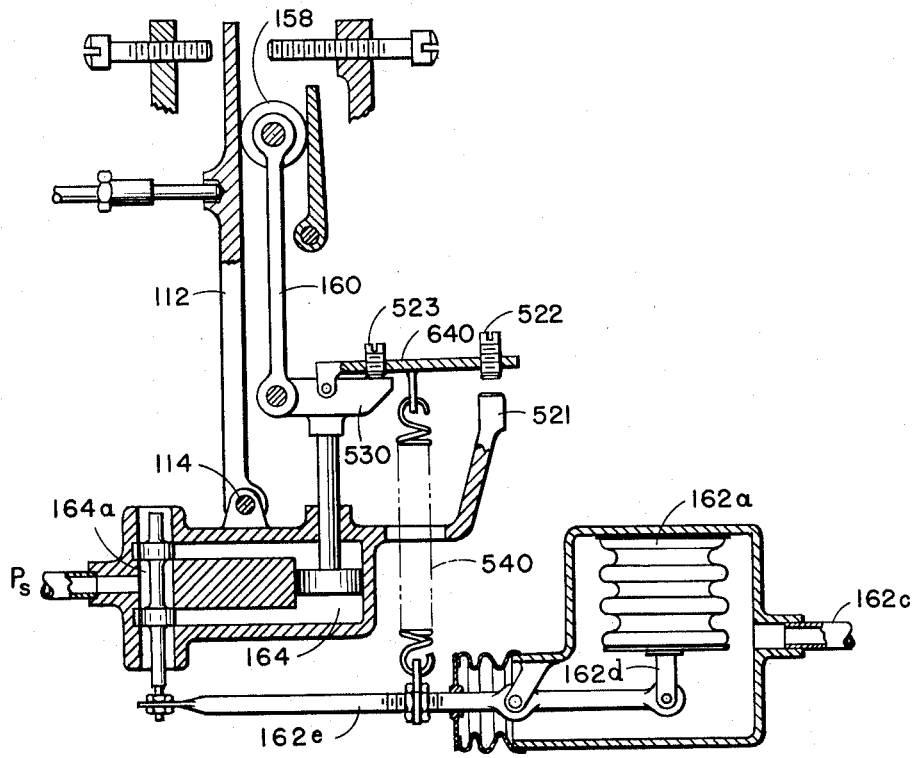

3,159,001
FUEL CONTROL AIR PRESSURE MULTIPLIER
AND MAIN METERING VALVE
Heinz F. Moellmann, Fairfield, Conn., assignor to Avco Corporation, Stratford, Conn., a corporation of Delaware
Continuation of application Ser. No. 814,519, May 20, 1959. This application Dec. 21, 1962, Ser. No. 246,876
6 Claims. (Cl. 60—39.28)

This invention relates to fuel control air pressure multiplier and main metering valve mechanism particularly used in metering fuel to gas turbine engines.

This application is a continuation of my application Serial No. 814,519, filed May 20, 1959, now abandoned.

In order to maintain the percentage of fuel metering accuracy over the fuel flow range, metering valves feeding fuel to gas turbine engines are in use which have a decreasing fuel flow change with decreasing fuel flow rates for a given change in the stroke of the valve. One relationship used in the design of such a valve is known as the quadratic valve characteristic, and the several moving parts and passages of the valve are so designed that the following equation is substantially satisfied:

$$W_f = A \times S_v^2$$
$W_f$=Fuel flow rate
$S_v$=Valve stroke
$A$=Constant

The above relationship is designed into the valve and is a characteristic of the fuel flow rate obtained through the valve with change of stroke.

In using such a valve and providing mechanism to compensate for changes in inlet air pressure to the compressor, with which this invention is particularly concerned, it is important that the mechanism for such compensation works in harmony with the above relationship in stroke, as any compensating change over a change in fuel flow rate over a change in compensating air pressure will have to follow the valve characteristic as regards the relationship between stroke and flow rate in order that the compensation for change in pressure be properly applied to change the flow rate. Therefore, with the above type of valve, the so-called $P_1$ multiplier—in other words, the linkage used to impose a change in the stroke of the valve to compensate for air pressure variation—must have a certain characteristic, and this has been determined to be as follows, to work properly with a valve having a quadratic characteristic as above set forth. The multiplication ratio of the linkage to accomplish this purpose should be as follows:

$$M_p = B \times \sqrt[2]{P_1}$$
$M_p$=Multiplication ratio $P_1$ multiplier
$B$=Constant Prior art mechanisms to accomplish the above purpose have required structures of considerable complication, and it is a principal object of the present invention to provide a mechanism which will simplify the structure necessary to accomplish the above results, and it is the general concept that the metering valve spring-urged in one direction may be adequately controlled by the swing of a relatively long lever moving in substantial parallelism with another control lever reflecting other parameters of control, and between two such parallel levers a roller moving as a function of inlet air pressure variation will complete a linkage to provide a mechanism of relative simplicity which in practical result will satisfy the requirements above set forth within practical operating range. Linkage ranges can be selected to afford a wide range of variation in condition and even in change of valve characteristics.

The above and other objects of the invention will appear more fully from the following more detailed description and by reference to the accompanying drawings forming a part hereof, and wherein:

FIGURE 2 and FIGURE 2A are views in perspective and partly in section showing the fuel control of this invention, including the linkage mechanism for using the parameter of inlet air pressure for varying the metering of the fuel;

FIGURE 3 is a view partly in section of a modified form of the inlet pressure responsive mechanism and linkage particularly adapted for imposing an independently adjustable variation in the pressure compensation in the low pressure region, corresponding to high altitude operations.

Figure 1:
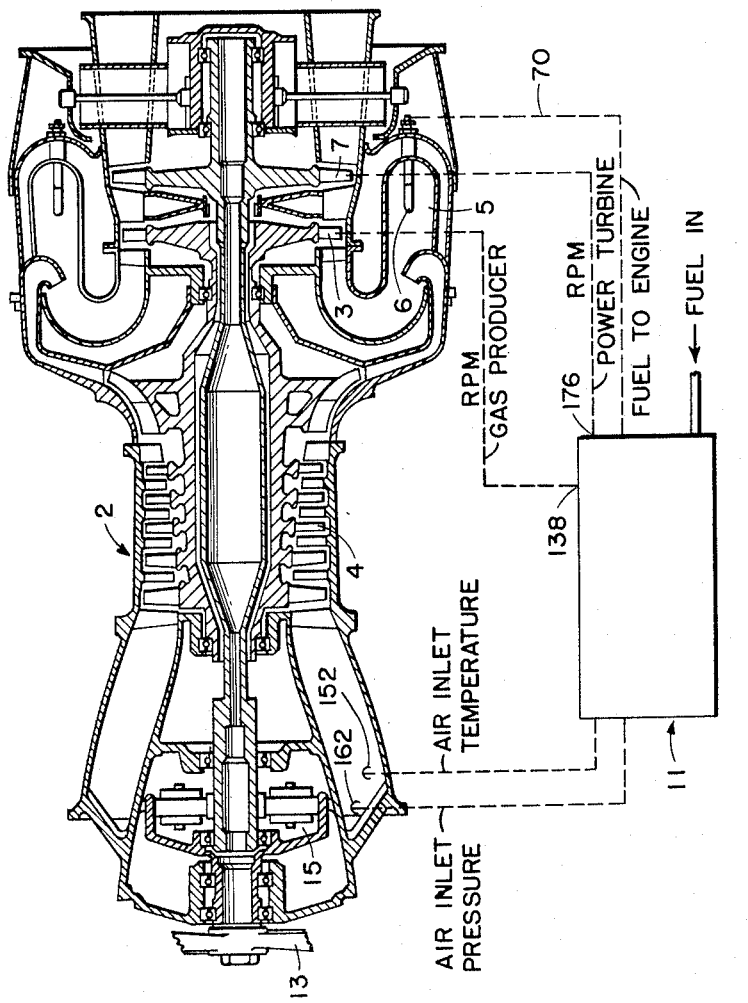
FIGURE 1 is a cross-section of a gas turbine power plant with a schematically indicated fuel control operatively connected thereto.

Referring to FIGURE 1:

A gas turbine power plant 2 employs a compressor driving turbine 3, sometimes called "gas producer turbine," which drives a compressor 4 to furnish compressed air to an annular combustion chamber 5 to which fuel is supplied from nozzles 6 from fuel inlet 70. Turbine 3 and compressor 4 are sometimes individually and collectively referred to in the art as the gas-producer portion of the gas turbine engine. Resultant hot gases from combustion and resultant flow thereof act to drive the power turbine 7 as well as the so-called gas producer turbine 3 in the power plant illustrated. The power turbine 7 drives the propeller 13 through reduction gear 15 and suitable drive shaft. The fuel control is generally designated as 11 in FIGURE 1.

Various parameters of engine operation are diagrammatically illustrated in FIG. 1 as imposing control for fuel flow variation on the fuel control 11. For instance, the r.p.m. of the gas producer tubine 3 is imposed at 138, which is indicated by like reference numeral in FIGURE 2 of the drawings, and also the r.p.m. of the power turbine 7 is imposed at numeral 176 adjacent fuel control 11, which is also designated in FIGURE 2 of the drawings. The air inlet temperature and the air inlet pressure are indicated by their elements at 152 for temperature and 162 for pressure in the inlet to the air compressor 4, and these numerals also refer to the corresponding elements similarly numbered in FIGURE 2.

A main metering valve 54 (FIG. 2) controls fuel flow by its longitudinal position of movement, thereby determining an orifice size and rate of flow for each position made possible by a regulated uniform pressure drop across the valve 54 by mechanism known in the art but not disclosed herein. Therefore, the longitudinal position of member 110 determines the orifice size and amount of fuel flow to the engine. Fuel flows from source at 52 not detailed herein, metered through valve 54 to inlet 68, 70 to the engine.

The metering valve 54 is spring urged by spring 125 in a direction to the right, as shown in the drawing, and therefore movement to the left is against this spring action, as shown, and a movement of the valve actuating member 110 to the right will increase fuel flow, and a movement in the opposite direction will decrease fuel flow. The various control movements to vary the flow of fuel are impressed upon this control member 110 by means of a rockshaft assembly 124 (see FIG. 2), which by control contact with several levers, all projecting radially from rockshaft 124, such as 181, 128, and 156 for power turbine r.p.m., and gas producer r.p.m., respectively, provides a linkage for the application of the various control parameters above enumerated acting through the rockshaft, to position the actauting member 110 and thus to vary the orifice opening of the main metering valve 54.

The spring 126 and valve 54 urged by spring 125 tend to rotate the rockshaft clockwise and to open valve 54. Therefore, the limitation opposing the clockwise rotation of rockshaft 124 will be imposed by the most outwardly projecting contact with radial levers 181, 128 and 156, and the control which limits the movement of the valve toward open position to the greater extent (that is, the one calling for least fuel) will override others in its effect with the mechanical arrangement as provided.

The compensating pressure variation of the inlet air to the compressor, with which this invention is primarily concerned, is imposed on the fuel control mechanism by a change in the position of a roller 158 located between two substantially parallel levers 112 and 122, which are located in the linkage mechanism which positions the previously mentioned member 110 for controlling the opening of the fuel metering valve 54. This location of the roller 158 between the two parallel levers changes the lever arms in such a way that the fuel flow rate is varied with pressure change and a more detailed description of this mechanism will follow, but it is helpful in a preliminary understanding of the mechanism here considered for effecting a compensation for variation in air pressure to know that the pressure variation causes movement of the aforesaid roller 158 through link 160 as positioned by a multiplier bar and servo mechanism 164 actuated by a pressure capsule 162a which is actuated by air pressure brought into the chamber from the previously mentioned air inlet pressure responsive member 162.

It is necessary, for an understanding of the pressure unit mechanism with which this invention is primarily concerned to have a general understanding of the operation of the other control units which will operate to complete the mechanism controlling the pressure variation. For instance, the effect of power turbine 7 speed is imposed upon the rockshaft through radial lever 181 of servo mechanism 179, 180, 184 actuated through the power turbine responsive governor 176.

Gas producer 3, 4, speed of rotation actuates the governor 138, which through servo mechanism 140, 143 and linkage mechanism 141 actuates a longitudinal member 134, which is thereby positioned as a function of gas producer 3, 4, r.p.m. from governor 138. The rod 134 moves toward the right, as shown in the drawing as indicated by the arrow, for increasing r.p.m. of the gas producer 3, 4, and toward the left for decreasing r.p.m. This longitudinal movement acts on a linkage mechanism, making first contact therewith through lever 146, which in turn actuates servo mechanism 132 to act through member 130 upon projecting lever 128 to impose the gas producer speed control variation on the rockshaft 124 to increase or decrease the opening of the fuel metering valve in response thereto.

A more detailed description of the operation of the linkage, here designated generally as 146, 147, as well as the main power lever linkage mechanism (here generally designated as 151, 151a, 151b, 151c, 151d) and a feedback lever 153, is contained in copending application Serial No. 814,531 filed May 20, 1959, and assigned to the same assignee as the present invention.

A variation in temperature of the air entering the compressor is compensated for by so-called 3–D cam 148 rotatably mounted on the axis of the rod 134, as shown. The cam surfaces 148a and 155 of this cam compensate for temperature on varying rotated positions of this cam as controlled by a temperature unit (see FIG. 2A) with sensor 152, bellows 150, and linkage 154a, 154c, more fully set forth in copending application Serial No. 814,520 filed May 20, 1959, now Patent No. 3,093,969, and assigned to the same assignee as this invention, and will not be described in detail herein.

Deceleration scheduling mechanism related to deceleration limiting lever 166 is a part of the control mechanism with which the mechanism of this invention cooperates. Such mechanism is however not described in detail herein but is disclosed and claimed in copending application Serial No. 814,548, filed May 20, 1959, now Patent No. 3,083,531, and assigned to the same assignee as the present invention.

The two part rockshaft 124a, 124b, with overtravel spring 170a forming a connection between the two parts is also described and is a part of the deceleration limiting mechanism. For the purpose of an understanding of the present invention, however, it may be assumed that the two parts of the rockshaft operate as one (as they do in normal steady-state and accelerating conditions) to transmit the variation effects of the various parameters of engine operation to lever 122.

The lever 122 projects from the rockshaft 124 in an upward position, as shown, and it will be apparent that the position of this lever reflects the effect of the various parameters of engine operation imposed by other controls tending to rotate the rockshaft, as has been described above. Parallel to the lever 122 and extending in a substantially greater length there is a second lever 112 having a pivot 114, which lever extends parallel to and spaced from the lever 122. The two opposing faces of the levers 112 and 122 have a roller 158 positioned therebetween, which roller is positioned by a link 160. This link is moved as a function of variation in inlet air pressure to the compressor by a pressure responsive unit 162a. This pressure responsive unit is carried in a casing 162b and is connected to the inlet air through a conduit connection 162c to the element 162 in the inlet air (see FIG. 1). Thus the pressure responsive unit 162 responds in expansion and contratcion of rod 162d to move a pivoted lever 162e, which movement actuates a servo valve 164a, the movement of which imposes servo pressure $P_s$ provided by mechanism well known in the art, but not shown herein, to move servo piston 164, which is connected with the end of link 160 to position the previously mentioned roller 158 as a function of variation in inlet air pressure. Thus the variation in inlet air pressure is imposed upon the control by varying the position of the pivot afforded by the roller 158 between the levers 122 and 112.

It is remembered from discussion above that the relationship desired for multiplication ratio of the pressure linkage is that this multiplier vary substantially as the square root of the pressure. Therefore, if this pressure variation is imposed by varying the effective radius of the lever 112 acting on the valve positioning member 110, then substantially a square root relationship will be imposed by the geometry of the linkage. By selection of the relatively long but definitely defined length of the lever 112 relative to lever 122 and further by positioning the travel of the pressure responsive link 160 and roller 158 substantially parallel to this lever to position the roller, makes possible a combination of elements which accomplishes the purpose desired without complication of mechanism.

In operation the inlet air pressure variation imposed on the fuel control through the link 160 and the positioning of roller 158, as described, works in cooperation with other parameters of engine operation. These include: gas producer speed of rotation imposed through the positioning of member 134 which acts through linkage 146; and the temperature unit 152, which with 3-D cam 148 imposes a temperature variation compensation through cam surface 148a. Therefore, in steady-state operation, the rotative speed of the gas producer speed factor, compensated for the temperature variation, positions the rockshaft 124 through servo mechanism 132, member 130, and lever 128. This arcuate positioning of the rockshaft is reflected in the lever 122, and the lever 122 operating in cooperation with lever 112 and the interposed roller 158 positioned by pressure linkage 160 imposes the variation in air inlet pressure on the combined control.

FIGURE 3 shows a modified form of the invention particularly adapted for providing a variation in the compensation afforded for low pressure region of operation corresponding to high altitude. The link 160 in FIG. 3 which positions the roller 158, is shown in FIG. 3 as extending downwardly along and substantially parallel to the lever 112, with the pivot 114 in similar relationship to the showing in FIG. 2, but having the servo mechanism 164 and the air pressure responsive mechanism 162a in a different position; although the modification described below could be employed with equal facility with the servo mechanism positioned above the roller 158 as shown in FIG. 2.

The opposite positioning of the servo mechanism 164 and the pressure unit 162a is not a determining factor in the modification herein disclosed; but the feature herein emphasized and which constitutes the important modification is a provision of a pivoted link 640 pivoted on the cross-bar 530 and provided with adjusting screws 522 and 523. An abutment 521 is provided so that when the servo piston 164 approaches the bottom of its stroke, corresponding to low air pressure high altitude operation, the effective spring rate of spring 540 will be decreased by the contact of the adjusting screw 522 on the abutment 521, which will cause the rate of change in the spring force to decrease in its effect against the multiplier bar 162e, and will therefore, depending upon the position of contact of the abutment 521 cause a change in the flow rate at the lower pressures becoming effective with the earlier contact with the abutment 521.

Although the invention has been described by reference to a specific structure found practical in actual operation, it is understood that various modifications are intended without departing from the general principles and within the scope of the claims appended hereto. It is specifically to be mentioned that although the pressure of the inlet air to the compressor, or so-called gas producer, is here used to impose this variation on the system, it is nevertheless intended that such pressure may be replaced by any other characteristic pressure in the engine, i.e., combustion chamber pressure or interstage compressor or turbine pressure by the use of similar compensating mechanism.

I claim:

1. In a fuel control for a gas turbine engine having a turbine rotating an air compressor, the combination comprising: a fuel metering valve, means to control the opening of said metering valve including a rotatable rockshaft, means to rotatively position said rockshaft responsive to several parameters of engine operation including speed of rotation of said air compressor, a first lever carried by and projecting from said rockshaft with the angular position thereof reflecting positioning by said parameters of engine operation, a second lever substantially longer in length than said first-mentioned lever, said second lever extending in a direction in near parallelism to said first-mentioned lever and extending past the axis of rotation of said rockshaft, an independent pivot for said second lever positioned at a distance substantially displaced in a direction longitudinally relative to said second lever from the axis of rotation of said rockshaft, the surfaces on said first lever and said second lever providing spaced longitudinally extending opposed faces, a contacting roller element positioned between said levers for contact with said opposed faces, and a linkage responsive to variations in an engine operating pressure for positioning said roller between said opposed faces in proportion to variation in said engine operating pressure, thus to position said second lever relative to said first lever with compensation for said pressure variation, and a connection from said second lever to said metering valve to control the opening of said metering valve in proportion to the movement of said second lever the lengths of said first and said second levers being in the lengths wherein the multiplication ratio effective to position said metering valve, resulting from the positioning of said engine pressure responsive roller element along the length of said levers, varies substantially as the square root of said operating pressure within the normal operating range of said linkage.

2. In a fuel control for a gas turbine engine having a turbine rotating an air compressor, the combination comprising: a fuel metering valve, means to control the opening of said metering valve including a rotatable rockshaft, means to rotatively position said rockshaft responsive to several parameters of engine operation including speed of rotation of said air compressor, a first lever carried by and projecting from said rockshaft with the angular position thereof reflecting positioning by said parameters of engine operation, a second lever substantially longer in length than said first-mentioned lever, said second lever extending in a direction in near parallelism to said first-mentioned lever and extending past the axis of rotation of said rockshaft, an independent pivot for said second lever positioned at a distance substantially displaced in a direction longitudinally relative to said second lever from the axis of rotation of said rockshaft, the surfaces on said first lever and said second lever providing spaced longitudinally extending opposed faces, said opposed faces extending in the same direction from said axis of rotation and said pivot respectively, a contacting roller element positioned between said levers for contact with said opposed faces, and a linkage responsive to variations in an engine operating pressure for positioning said roller between said opposed faces in proportion to variation in said engine operating pressure, thus to position said second lever relative to said first lever with compensation for said pressure variation, and a connection from said second lever to said metering valve to control the opening of said metering valve in proportion to the movement of said second lever the lengths of said first and said second levers being in the range wherein the multiplication ratio effective to position said metering valve, resulting from the positioning of said engine pressure responsive roller element along the length of said levers, varies substantially as the square root of said operating pressure within the normal operating range of said linkage.

3. In a fuel control for a gas turbine engine having a turbine rotating an air compressor, the combination comprising: a fuel metering valve, means to control the opening of said metering valve including a rotatable rockshaft, means to rotatively position said rockshaft responsive to several parameters of engine operation including speed of rotation of said air compressor, a first lever carried by and projecting from said rockshaft with the angular position thereof reflecting positioning by said parameters of engine operation, a second lever substantially longer in length than said first-mentioned lever, said second lever extending in a direction in near parallelism to said first-mentioned lever and extending past the axis of rotation of said rockshaft, an independent pivot for said second lever positioned at a distance substantially displaced from the axis of rotation of said rockshaft, the surfaces on said first lever and said second lever providing spaced longitudinally extending opposed faces, said opposed faces extending in the same direction from said axis of rotation and said pivot respectively, a contacting roller element positioned between said levers for contact with said opposed faces, and a linkage responsive to variations in an engine operating pressure for positioning said roller between said opposed faces in proportion to variation in said engine operating pressure, thus to position said second lever relative to said first lever with compensation for said pressure variation, and a connection from said second lever to said metering valve to control the opening of said metering valve in proportion to the movement of said second lever the lengths of said first and said second levers being in the range wherein the multiplication ratio effective to position said metering valve, resulting from the positioning of said engine pressure responsive roller element along the length of said levers, varies substantially as the square root of said operating pressure within the normal operating range of said linkage.

4. In a fuel control for a gas turbine engine having a turbine rotating an air compressor, the combination comprising: a fuel metering valve, means to control the opening of said metering valve including a rotatable rockshaft, means to rotatively position said rockshaft responsive to several parameters of engine operation including speed of rotation of said air compressor, a first lever carried by and projecting from said rockshaft with the angular position thereof reflecting positioning by said parameters of engine operation, a second lever substantially longer in length than said first-mentioned lever, said second lever extending in a direction in near parallelism to said first-mentioned lever and extending past the axis of rotation of said rockshaft, an independent pivot for said second lever positioned at a distance substantially displaced from the axis of rotation of said rockshaft, the surfaces on said first lever and said second lever providing spaced longitudinally extending opposed faces, a contacting roller element positioned between said levers for contact with said opposed faces, and a linkage responsive to variations in an engine operating pressure for positioning said roller between said opposed faces in proportion to variation in said engine operating pressure, thus to position said second lever relative to said first lever with compensation for said pressure variation, and a connection from said second lever to said metering valve to control the opening of said metering valve in proportion to the movement of said second lever the lengths of said first and said second levers being in the range wherein the multiplication ratio effective to position said metering valve, resulting from the positioning of said engine pressure responsive roller element along the length of said levers, varies substantially as the square root of said operating pressure within the normal operating range of said linkage.

5. In a fuel control for a gas turbine engine having a turbine rotating an air compressor, the combination comprising: a fuel metering valve, means to control the opening of said metering valve including a rotatable rockshaft, means to rotatively position said rockshaft responsive to several parameters of engine operation including speed of rotation of said air compressor, a first lever carried by and projecting from said rockshaft with the angular position thereof reflecting positioning by said parameters of engine operation, a second lever substantially longer in length than said first-mentioned lever, an independent pivot for said second lever positioned at a distance substantially displaced from the axis of rotation of said rockshaft, said second lever extending in a direction in near parallelism to said first-mentioned lever and extending past the axis of rotation of said rockshaft, the surfaces on said first lever and said second lever providing spaced longitudinally extending opposed faces, a contacting roller element positioned between said levers for contact with said opposed faces, and a linkage responsive to variations in an engine operating pressure for positioning said roller between said opposed faces in proportion to variation in said engine operating pressure, thus to position said second lever relative to said first lever with compensation for said pressure variation, and a connection from said second lever to said metering valve to control the opening of said metering valve in proportion to the movement of said second lever, said linkage responsive to variations in an engine operating pressure comprising an engine pressure responsive element, a pivoted member actuated in tilting movement by said pressure responsive element, connections from said pivoted member to position said roller, a pivot mounted to move with said roller, a second pivoted member carried by said pivot to move said second pivoted member with said roller, a resilient element for restraining said pivoted member and said roller connected between said first-mentioned pivoted member and said second pivoted member, and a fixed abutment in position to contact said second pivoted member in its lower pressure region of movement thereby to vary the restraining effect of said resilient element on said second pivoted member and said roller under low pressure and high altitude conditions to thereby provide decrease in fuel flow rate.

6. A fuel control mechanism as in claim 5 having manually adjustable means for varying the contacting region of said abutment.

References Cited in the file of this patent
UNITED STATES PATENTS

| | | |
|---|---|---|
| 2,700,872 | Lee | Feb. 1, 1955 |
| 2,941,601 | Best | June 21, 1960 |
| 2,957,488 | Farkas | Oct. 25, 1960 |